United States Patent Office 2,808,346
Patented Oct. 1, 1957

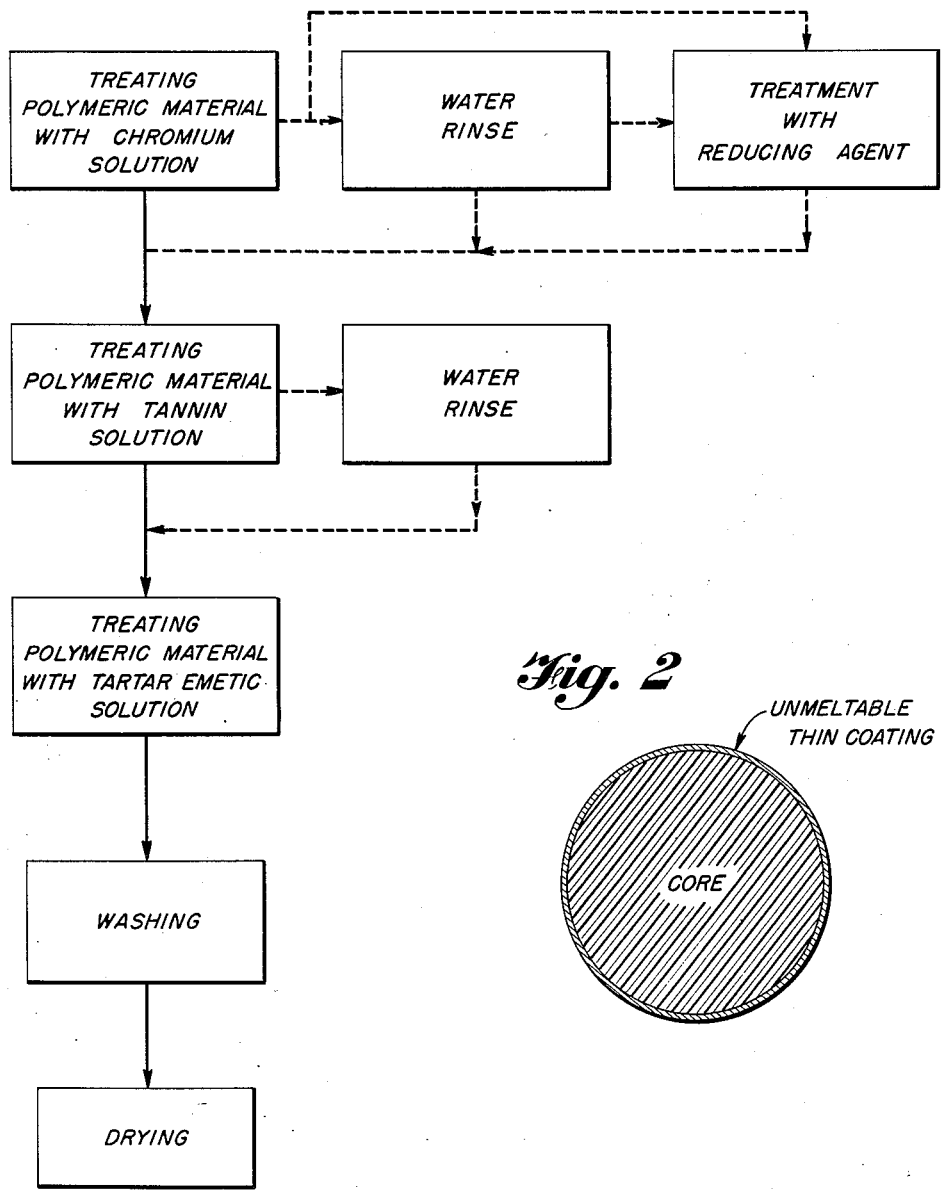

2,808,346

METHOD OF TREATING AN ARTICLE OF POLYMER CONTAINING POLYPEPTIDE GROUPS TO RENDER IT UNMELTABLE

Albertus Gerardus Lutgerhorst, Arnhem, Netherlands, assignor, by mesne assignments, to American Enka Corporation, Enka, N. C., a corporation of Delaware Application April 6, 1955, Serial No. 499,748

Claims priority, application Netherlands May 24, 1954

16 Claims. (Cl. 117—118)

This invention relates to the treatment of thermoplastic organic polymeric products, such as threads, fibers, films, foils and similar shaped products produced from synthetic linear thermoplastic polymeric materials containing a plurality of peptide or amide groups (—CO·NH— groups), for rendering such products unmeltable or relatively non-fusible when subjected to temperature conditions substantially above the normal melting point thereof. The invention also relates to products of the kind just indicated when treated in order to confer upon them the stated properties.

One of the principal objects of the present invention is to provide a new and improved method for treating polymeric materials of the kind indicated, whether in the form of threads, fibers, films, foils or other shaped products, in such manner as to render them much more resistant to elevated temperatures substantially above their normal melting or softening points. A further object of the invention is to provide a method for treating such materials for the purpose indicated in order to form a relatively unmeltable or non-fusible thin coating on the surface of the product which is chemically combined with the polymer molecules and which thin coating, though apparently quite superficial in nature, is substantially more resistant, at least for relatively short periods of time, to elevated temperatures substantially above the normal melting or softening points of the polymeric material proper from which the shaped product is fabricated. A still further object of the invention is to provide improved polymeric products of the nature indicated.

The manner in which these and other objects and features of the invention are attained will appear more fully from the following description thereof, in which reference is made to typical and preferred procedures in order to indicate more fully the nature of the invention, but without intending to limit the invention thereby.

The majority of thermoplastic products, such as threads, fibers, films, foils and like products produced from synthetic linear thermoplastic polymers, have the disadvantage that even when overheated above the melting point for only a short time they soften considerably and start melting.

Threads, fibers, films, yarns and foils which are used as an electric insulation material may then sinter and melt and the insulating property may disappear entirely or at least in part.

Cord made from such polymers and used as a reinforcement in automobile tires loses its required rigidity and becomes elongated at the high temperatures which sometimes prevail during use.

Woven products such as carpets, and foil-like products such as table-covers, curtains, etc. from these polymers may be easily damaged when they come into contact with a burning cigarette.

Also there is the risk that if a person wears garments manufactured from these polymers, particularly underwear, and his garments catch fire, those made from thermoplastic material will stick to his body and therefore constitute an extra hazard.

According to the method of this invention it has been found possible to remove these disadvantages for a certain kind of polymers, namely those which, like polyamides, polyurethanes, polyamide-esters and like polymers, contain polypeptide groups (—CO·NH—). For this purpose there is formed on the surface of the product manufactured from said polymers an unmeltable thin coating in combination with the molecules of the polymer.

The method according to this invention for rendering unmeltable products, such as threads, fibers, films and foils, from synthetic linear thermoplastic polymers which, like the preferred polyamides, contain polypeptide groups (—CO·NH— groups), is characterized in that the products are treated with a solution of a chromium compound, a solution of tannin and a solution of tartar emetic in an arbitrary sequence, whereupon the products are washed and dried.

The invention may be more completely understood by reference to the drawing wherein:

Figure 1 is a diagrammatic flow sheet illustrating one embodiment of the process of the present invention; and Figure 2 is a cross-sectional enlarged drawing of a polymeric filament treated in accordance with Example 1 hereafter described.

It has been found that as chromium salts for example potassium dichromate, chromic sulphate and chromium acetate are suitable, although other water-soluble chromium salts or compounds may also be employed.

The solutions may be acidified with formic acid which in the case of the tannin solution is particularly favorable.

For products of limited dimensions, such as fibers, threads in the form of skeins or packages, one may apply the same method as used when dyeing in which so much dye is added that after the dyeing process the dye bath is exhausted.

In the case of products such as films, foils, webs of fabric, warps of threads, etc., it is preferred to work continuously, the products being led at a certain speed successively through the various treating baths having a constant concentration of chemicals.

One may not only treat undyed products but also dyed products and also combine the dyeing with the three treatments according to the invention, the products being first dyed and thereafter treated according to the invention.

Treatment of undyed products produces lightly colored products or products having no color at all.

The possible coloring may be reduced if the treatment with a solution of a chromium compound is followed by a treatment with a reducing agent, for example a diluted sodium thiosulphate solution.

Other metal compounds, such as those of aluminum, iron, and tin, which are often used in the dyeing process instead of chromium compounds, are not suitable since they produce only a thin coating whose melting point is only slightly higher than that of the polymer itself.

It is preferred to use treating baths having a temperature of 60–100° C. and preferably 90–95° C.

As regards a washing treatment between the individual treating baths comprising the aforesaid aqueous solutions, a simple rinsing treatment generally suffices. However, it is desirable to wash the treated products rather thoroughly immediately before drying.

The invention is illustrated below by a number of examples, which are illustrative only. The products mentioned in the examples were all obtained from the polymerization product of caprolactam by melt-spinning or melt-casting.

In the examples in which the treating bath is exhausted the percentage of the chemicals is based on the yarn weight. The treatment is carried out at a bath ratio of 1:40; however, this is only done in order to obtain comparable results.

In the examples in which the treatment is carried out continuously, the concentration of the baths, which is kept constant, is given in percentages based on the volume of the bath.

Example I

A skein of polyamide fiber yarn consisting of 15 denier fibers was treated according to the exhaustion method successively with a chromium salt bath, a tannin bath and a bath of tartar emetic. The bath ratio was 1:40.

At the start, the chromium salt bath contained 1% by weight of potassium dichromate and 2% by weight of formic acid (85%). The treatment period amounted to 60 minutes at 95–100° C. Thereafter the material was rinsed.

At first the tannin bath contained 4% by weight of tannin and 4% by weight of formic acid. The treatment was carried out during 30 minutes at 90° C.

The tartar emetic bath contained in the beginning 2% by weight. Treatment was carried out for 30 minutes at 90° C.

Thereafter the material was washed by rinsing and finally dried at 60° C.

The color of the yarn was light brown. When examined under the microscope, the fibers did not melt together when heated above 280° C., and the shape of the thread was maintained due to the unmeltable thin coating.

Example II

The treatment was carried out as in Example I, however, with the difference that after the chromium salt treatment and the rinsing a reduction bath was used which in the beginning contained 1% by weight of sodium thiosulphate. The treatment was carried out during 45 minutes at 95° C. The treated yarn had a much lighter color than the yarn of Example I. It had a light cream-like color and it was likewise unmeltable.

Example III

Polyamide fiber yarn as in Example I was treated as follows at a bath ratio of 1:40.

At the start the chromium salt bath contained 3% by weight of chromic sulphate and 1% by weight of formic acid (85%). The treatment was carried out during 45 minutes at 95° C.

After rinsing during a short time the treatment with the tannin bath followed, and thereafter the treatment with the tartar emetic bath was applied.

Initially the tannin bath contained 4% by weight of tannin and 4% by weight of formic acid (85%). Treatment was carried out during 30 minutes at 90° C.

The tartar emetic bath contained initially 2% by weight of tartar emetic. The treatment was carried out during 20 minutes at 90° C.

Finally the yarn was rinsed and dried.

When the treated yarn was heated under the microscope above the melting point of the polyamide it was found that the fiber shape remained intact whilst it was possible to distinguish the liquid polymer under the unmeltable thin coating.

Example IV

The original polyamide yarn was first dyed at a bath ratio of 1:40 in a bath containing 1.5% by weight of Erionylchrome red R. C. (Geigy), to which was added 2% by weight of formic acid (85%). During dyeing the bath was heated in 30 minutes to 95° C., thereafter in 45 minutes to 95–100° C.

Thereafter mordanting was carried out with 1% by weight of potassium dichromate (in the same bath) during 45 minutes at 95–100° C., and thereupon the material was rinsed during a short time. The use of mordant dyes has the advantage that a chrome treatment—which otherwise might be required—may be dispensed with. In this case 1% of dichromate was used instead of ¾% normally required for after-mordanting the dye in that case.

The tannin bath had an initial concentration of 4% by weight of tannin and 4% by weight of formic acid (85%). Treatment was carried out during 30 minutes at 90° C.

The tartar emetic bath had an initial concentration of 2% by weight of tartar emetic. Treatment was carried out during 20 minutes at 90° C. Thereafter the material was rinsed and finally dried.

The yarn which had been dyed red was heated above 280° C., but did not melt, whilst the shape of the fibers remained intact.

Example V

The treatment was carried out according to Example IV, however, with the difference that dyeing took place in a dye bath containing 1.5% by weight of Solochromate blue B. 150 (I. C. I.).

Apart from the color the results were the same as those of Example IV.

Example VI

The treatment was carried out according to Example IV, however, with the difference that first dyeing was effected with an acid dye (Telon echtgelb G. N. Bayer), and the chromium salt treatment was carried out with chromic sulphate instead of potassium dichromate.

Example VII

A plurality of 250 threads running parallel to and at some distance from each other (warp) each having a titre of 90 deniers and each consisting of 60 elementary threads was treated according to the invention.

The threads were set at 6 mm. apart so that the width of the warp amounted to about 150 cm. The warp was continuously led through the various treating baths arranged one after the other.

In order to increase the time of treatment respectively to shorten the treating troughs, said troughs were each provided with two rows of conveyor rollers, one vertically above the other, so that the threads could be guided up and down through these troughs.

The conveyor rollers were positively driven and at such a speed as to prevent an undesirable stretching or shrinking.

The first treating bath contained 40 g. per liter of chromic sulphate. The temperature amounted to 95° C. and the time of immersion was 25 sec.

The second treatment bath contained 50 g. per liter of tannin and 4 g. per liter of formic acid. The temperature was 90–95° C., whilst the time of immersion amounted to 4 sec.

The third treating bath of 92° C. contained 25 g. per liter of tartar emetic. The time of immersion was 25 sec.

The water bath following thereafter had a temperature of 20° C. The time of immersion was 10 sec.

Finally, the threads were dried on rollers (100° C.) and thereafter wound up.

Example VIII

A film-like web having a width of 1 mm. and a thickness of 0.2 mm. was treated in an analogous way as the warp of Example VII, however, with the following differences:

Chromium salt bath:
  50 g./liter of chromic sulphate
  temperature: 90–95° C.
  immersion time: 30 sec.
Tannin bath:
  60 g./liter of tannin
  4 g./liter of formic acid
  temperature: 90–95° C.
  immersion time: 45 sec.

Tartar emetic bath:
  30 g./liter of tartar emetic
  temperature: 90° C.
  immersion time: 30 sec.
Water bath:
  room temperature
  immersion time: 10 sec.
Drying rollers: temperature: 100° C.

A repetition of the procedures of the foregoing examples with the condensation product of hexamethylene diamine and adipic acid yielded corresponding results.

While specific examples of preferred methods and reagents embodying the present invention have been described above, it will be apparent that many changes and modifications may be made in the methods of procedure and in the reagents and in the order of their use without departing from the spirit of the invention. It will therefore be understood that the examples cited and the particular proportions and methods of procedure set forth above are intended to be illustrative only, and are not intended to limit the invention.

What is claimed is:

1. A method of treating threads, fibers, films, foils and the like products made from synthetic thermoplastic linear polymers containing polypeptide groups which comprises successively contacting in any arbitrary sequence the products with a solution of a chromium compound, a solution of tannin, and a solution of tartar emetic, the temperature of the solutions being about 60° C.–100° C. and the time of contact being about 4 seconds to 60 minutes, whereby to render the products unmeltable, rinsing said products after contact with each of said solutions and thereafter drying the treated products.

2. A method according to claim 1 wherein at least the tannin solution is acidified.

3. A method according to claim 2 wherein at least the tannin solution is acidified with formic acid.

4. An exhaustion method of treating threads, fibers, films, foils and the like products made from synthetic thermoplastic linear polymers containing polypeptide groups which comprises successively contacting in any arbitrary sequence the products with a solution of a chromium compound, a solution of tannin, and a solution of tartar emetic, the temperature of the solutions being about 60° C.–100° C., the treating solutions being prepared batchwise for weighed-out quantities of the product to be treated, the content of chemicals in said baths being based on the weight of the product, whereby to render the products unmeltable and thereafter washing and drying the treated products.

5. A continuous method of treating polymeric products which have large dimensions in one direction only, such as continuous threads, warps, film and foil webs, and webs of fabrics and which are made from synthetic thermoplastic linear polymers containing polypeptide groups which comprises successively contacting in any arbitrary sequence the products with a solution of a chromium compound, a solution of tannin and a solution of tartar emetic, the temperature of the solutions being about 90° C.–100° C. and the time of each treatment being about 4–45 seconds, the product being led at a predetermined speed successively through the several treating baths each having a constant concentration of chemicals, whereby to render the products unmeltable, rinsing said products after contact with each of said solutions and thereafter drying the treated products.

6. A method according to claim 5 wherein the initial polymeric products have already been dyed.

7. A method according to claim 5 wherein the polymeric products immediately after treatment with the chromium compound are treated with a reducing agent.

8. A method according to claim 7 wherein the reducing agent is sodium thiosulphate.

9. A method of treating threads, fibers, films, foils and the like products made from synthetic thermoplastic linear polymers selected from a class consisting of polyamides, polyurethanes, and polyamide-esters, which comprises successively contacting in any arbitrary sequence the products with a solution of chromium compound, a solution of tannin, and a solution of tartar emetic, the temperature of the solutions being about 60° C.–100° C. and the time of each treatment being about 20–60 minutes, whereby to render the products unmeltable, rinsing said products after contact with each of said solutions and thereafter drying the treated products.

10. A method according to claim 9 wherein at least the aqueous tannin solution is acidified.

11. A method according to claim 10 wherein at least the tannin solution is acidified with formic acid.

12. A method according to claim 9 wherein the initial polymeric products immediately after treatment with a chromium compound are treated with a reducing agent.

13. A method according to claim 12 wherein the reducing agent is sodium-thiosulphate.

14. A method of treating threads, fibers, films, foils, and the like products made from thermoplastic synthetic linear polyamides which comprises successively contacting in any arbitrary sequence the product with an aqueous solution of a chromium compound, an aqueous solution of tannin and an aqueous solution of tartar emetic, the temperature of the solutions being about 60° C.–100° C. and the time of contact being about 4 seconds to 60 minutes, whereby to render the products unmeltable, rinsing said products after contact with each of said solutions and thereafter drying the treated products.

15. A method of treating threads, fibers, films, foils, and the like products made from thermoplastic synthetic linear polyamides which comprises successively contacting in any arbitrary sequence the product with an aqueous solution of a chromium compound selected from the class consisting of potassium dichromate, chromic sulphate and chromium acetate, an aqueous solution of tannin and an aqueous solution of tartar emetic, the temperature of the solutions being about 60° C.–100° C. and the time of contact being about 4 seconds to 60 minutes, whereby to render the products unmeltable, rinsing said products after contact with each of said solutions and thereafter drying the treated products.

16. A method according to claim 15 wherein polyamides are selected from the class consisting of polycaprolactam and the condensation product of hexamethylene diamine and adipic acid.

References Cited in the file of this patent

UNITED STATES PATENTS

| | | |
|---|---|---|
| 2,299,839 | McQueen | Oct. 27, 1942 |
| 2,368,690 | Tschudin | Feb. 6, 1945 |
| 2,422,666 | Fuller | June 24, 1947 |